(12) United States Patent
Niijima et al.

(10) Patent No.: US 8,201,654 B2
(45) Date of Patent: Jun. 19, 2012

(54) AIR CLEANER SYSTEM FOR MOTORCYCLE

(75) Inventors: Shun Niijima, Saitama (JP); Hirotaka Nagatani, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 115 days.

(21) Appl. No.: 12/774,494

(22) Filed: May 5, 2010

(65) Prior Publication Data

US 2010/0294581 A1    Nov. 25, 2010

(30) Foreign Application Priority Data

May 22, 2009    (JP) ................................. 2009-123972

(51) Int. Cl.
*B62D 61/02*    (2006.01)

(52) U.S. Cl. ...................................................... 180/219
(58) Field of Classification Search .................... 180/219
See application file for complete search history.

(56) References Cited

U.S. PATENT DOCUMENTS

| | | | | |
|---|---|---|---|---|
| 5,609,658 A | * | 3/1997 | Takemura et al. | 55/385.3 |
| 5,908,079 A | * | 6/1999 | Amino | 180/219 |
| 6,283,242 B1 | * | 9/2001 | Umeoka et al. | 180/219 |
| 6,409,783 B1 | * | 6/2002 | Miyajima et al. | 55/385.3 |
| 2005/0139184 A1 | * | 6/2005 | Amino | 123/184.31 |
| 2006/0213475 A1 | * | 9/2006 | Sekimoto | 123/184.35 |

FOREIGN PATENT DOCUMENTS

| | | |
|---|---|---|
| JP | 2712014 B2 | 10/1997 |
| JP | 2006-264470 A | 10/2006 |

* cited by examiner

*Primary Examiner* — Tony Winner
(74) *Attorney, Agent, or Firm* — Birch, Stewart, Kolasch & Birch, LLP

(57) ABSTRACT

A saddle-riding type vehicle includes an air intake path disposed between a front bank and a rear bank and an air cleaner connected to an outer side of the air intake path. The air cleaner includes an air cleaner case and an air cleaner element housed in the air cleaner case. The air cleaner case includes air intake ducts disposed on either side of the air cleaner element in a vehicle longitudinal direction across the air cleaner element.

18 Claims, 6 Drawing Sheets

AIR CLEANER SYSTEM FOR MOTORCYCLE

CROSS-REFERENCE TO RELATED APPLICATIONS

The present application claims priority under 35 USC 119 to Japanese Patent Application No. 2009-123972 filed on May 22, 2009 the entire contents of which are hereby incorporated by reference.

FIELD OF THE INVENTION

The present invention relates, in general, to saddle-riding type vehicles and, in particular, to an air cleaner for a saddle-riding type vehicle.

DESCRIPTION OF BACKGROUND ART

A saddle-riding type vehicle is known that includes a V-type engine on either side of which an air cleaner and an air intake chamber connected to a downstream side of the air cleaner are disposed. The air cleaner and the air intake chamber are connected by an air intake duct that is disposed between a front bank and a rear bank. See, for example, Japanese Patent No. 2712014.

Another saddle-riding type vehicle is known that includes a V-type engine, and a center air cleaner and side air cleaners disposed upwardly, and on either crosswise side, of a V-bank space of the V-type engine. The vehicle further includes a throttle body disposed between the center air cleaner and the V-bank space. The center air cleaner is connected to an air intake port of each cylinder via the throttle body. Further, the side air cleaners are connected to the center air cleaner via an air intake duct. The side air cleaners further include an air intake port formed therein. The air intake port communicates with an outside and faces the V-bank space side. See, for example, Japanese Patent Laid-Open No. 2006-264470.

However, the saddle-riding type vehicles disclosed in Japanese Patent No. 2712014 and Japanese Patent Laid-Open No. 2006-264470, involve a complicated air cleaner structure, resulting in an increased manufacturing cost, though a sufficient air intake capacity of the air cleaner can be achieved.

SUMMARY AND OBJECTS OF THE INVENTION

An embodiment of the present invention provides a saddle-riding type vehicle that can reduce a manufacturing cost by simplifying the structure of an air cleaner.

According to an embodiment of the present invention, there is provided a saddle-riding type vehicle having a V-type engine disposed between a front wheel and a rear wheel, the V-type engine includes a front bank that extends upwardly from a crankcase at a front portion thereof and a rear bank that extends upwardly from the crankcase at a rear portion thereof. The saddle-riding type vehicle includes an air intake path disposed between the front bank and the rear bank and an air cleaner connected to an outer side of the air intake path in a vehicle width direction. The air cleaner includes an air cleaner case and an air cleaner element housed in the air cleaner case. The air cleaner case includes air intake ducts disposed on either side of the air cleaner element in a vehicle longitudinal direction across the air cleaner element.

According to an embodiment of the present invention, the air cleaner case is formed into a substantially streamlined shape (what is called, a teardrop shape) in a vehicle side view, having a larger arc on a vehicle forward side and a smaller arc on a vehicle rearward side and a rear side air intake duct of the air intake ducts is disposed at a rear end portion of the air cleaner case.

According to an embodiment of the present invention, in addition to the arrangements described above, the air intake ducts are disposed outwardly in the vehicle width direction of the front bank and the rear bank in a vehicle side view.

According to an embodiment of the present invention, a front side air intake duct of the air intake ducts extends in a vehicle vertical direction, while the rear side air intake duct extends in the vehicle width direction.

According to an embodiment of the present invention, the front side air intake duct draws air in from a lower side of the air cleaner case, while the rear side air intake duct draws air in from an inner side in the vehicle width direction of the air cleaner case.

According to an embodiment of the present invention, the air cleaner element is formed into an asymmetric shape in the vehicle longitudinal direction in a vehicle side view.

The saddle-riding type vehicle according to an embodiment of the present invention includes the air intake path disposed between the front bank and the rear bank and the air cleaner connected to an outer side of the air intake path in the vehicle width direction. The air cleaner includes the air cleaner case and the air cleaner element housed in the air cleaner case. The air cleaner case includes the air intake ducts disposed on either side of the air cleaner element in the vehicle longitudinal direction across the air cleaner element. The structure of the air cleaner can therefore be simplified, so that manufacturing cost can be reduced. The air intake ducts are disposed on either side of the air cleaner element in the vehicle longitudinal direction across the air cleaner element. The entire air cleaner element can therefore be effectively used.

In the saddle-riding type vehicle according to an embodiment of the present invention, the air cleaner case is formed into a substantially streamlined shape (what is called, the teardrop shape) in a vehicle side view, having a larger arc on the vehicle forward side and a smaller arc on the vehicle rearward side and the rear side air intake duct of the air intake ducts is disposed at a rear end portion of the air cleaner case. A dead space of the rear end portion of the air cleaner case having the substantially streamlined shape (the so-called teardrop shape) can be effectively used.

In the saddle-riding type vehicle according to an embodiment of the present invention, the air intake ducts are disposed outwardly in the vehicle width direction of the front bank and the rear bank in a vehicle side view. Air intake ports of the air intake ducts are not therefore exposed on the outside, which improves appearance of the saddle-riding type vehicle and prevents entry of dust, water, or other foreign matter in the air cleaner case.

In the saddle-riding type vehicle according to an embodiment of the present invention, the front side air intake duct of the air intake ducts extends in the vehicle vertical direction, while the rear side air intake duct extends in the vehicle width direction. Entry of dust, water, or other foreign matter in the air cleaner case can be further prevented.

In the saddle-riding type vehicle according to an embodiment of the present invention, the front side air intake duct draws air in from the lower side of the air cleaner case, while the rear side air intake duct draws air in from the inner side in the vehicle width direction of the air cleaner case. Entry of dust, water, or other foreign matter in the air cleaner case can be even further prevented.

In the saddle-riding type vehicle according to an embodiment of the present invention, the air cleaner element is formed into an asymmetric shape in the vehicle longitudinal direction in a vehicle side view. The air cleaner element can therefore be made large to fit the shape of the air cleaner case, so that the air cleaner element can have a larger filtration area.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
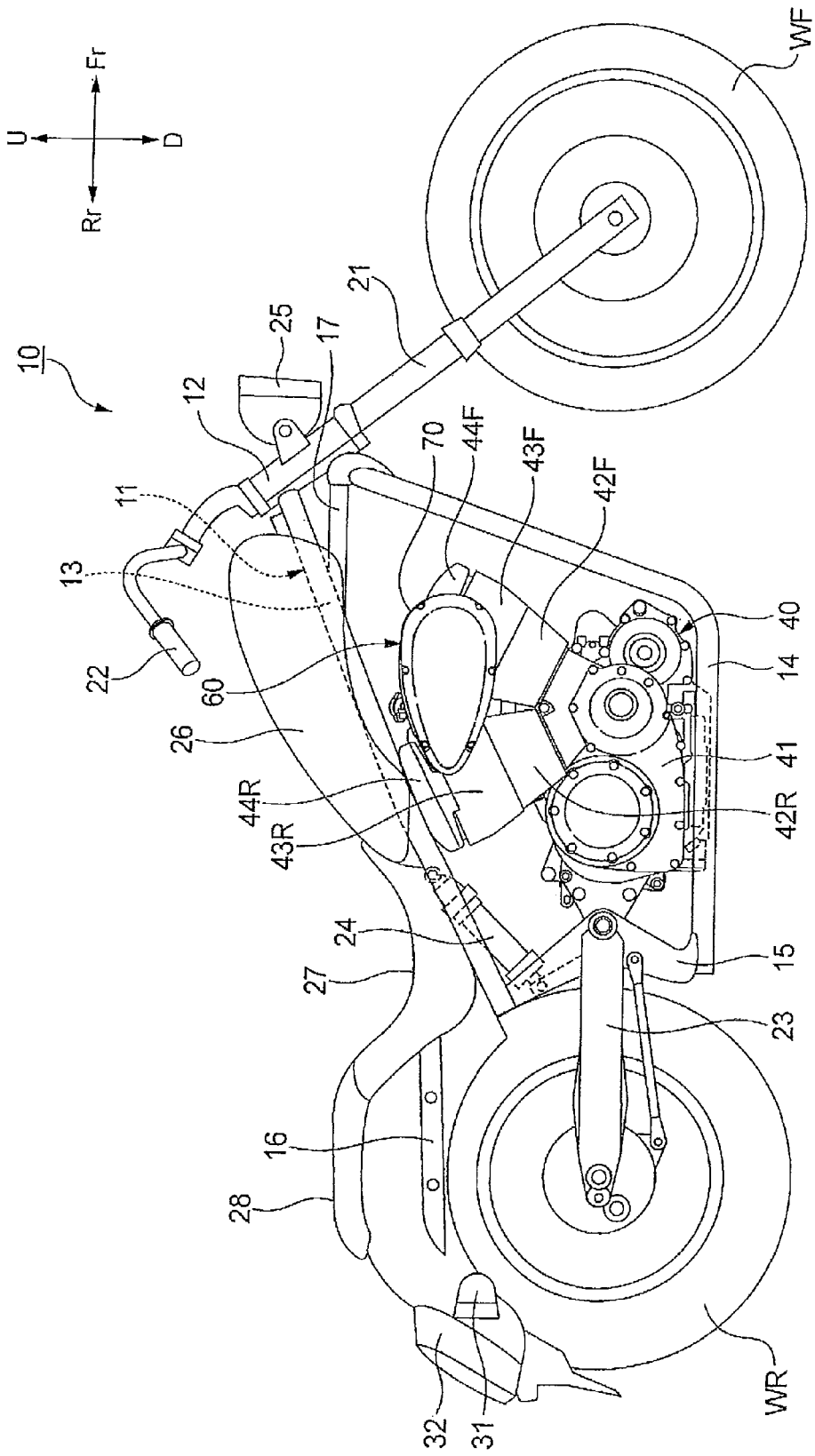
FIG. 1 is a right side elevational view for illustrating a saddle-riding type vehicle according to an embodiment of the present invention.

A saddle-riding type vehicle according to a specific embodiment to which the present invention is applied will be described below with reference to the accompanying drawings. The drawings should be viewed in the direction of reference symbols. Throughout the descriptions given hereunder, expressions indicating directions including front and rear, right and left, and up and down mean the same directions as viewed from a rider. In the drawings, Fr indicates forward of the vehicle, Rr indicates rearward of the vehicle, L indicates leftward of the vehicle, R indicates rightward of the vehicle, U indicates upward of the vehicle, and D indicates downward of the vehicle.

A motorcycle (saddle-riding type vehicle) 10 according to the embodiment of the present invention includes a vehicle body frame 11. The vehicle body frame 11 includes a head pipe 12, a pair of left and right main frames 13, a pair of left and right down frames 14, a pair of left and right pivot plates 15, a pair of left and right rear frames 16, and a reinforcement frame 17. More specifically, the head pipe 12 is disposed at a front end of the vehicle body frame 11. The main frames 13 extend rearwardly and downwardly from the head pipe 12. The down frames 14 extend downwardly and rearwardly from the head pipe 12. The pivot plates 15 are connected to rear end portions of the main frames 13 and the down frames 14. The rear frames 16 are connected to upper end portions of the pivot plates 15 and extend rearwardly. The reinforcement frame 17 connects between each of front end portions of the down frames 14 and each of intermediate portions of the main frames 13. An engine 40 is mounted on the main frames 13, the down frames 14, and the pivot plates 15.

The motorcycle 10 further includes a front fork 21, a front wheel WF, a steering handlebar 22, a swing arm 23, a rear wheel WR, a shock absorber 24, a headlight 25, a fuel tank 26, a rider seat 27, and a pillion seat 28. More specifically, the front fork 21 is steerably supported on the head pipe 12. The front wheel WF is rotatably supported at a lower end portion of the front fork 21. The handlebar 22 is disposed at an upper end portion of the front fork 21. The swing arm 23 is swingably supported on the pivot plate 15. The rear wheel WR is rotatably supported at a rear end portion of the swing arm 23. The shock absorber 24 swingably connects between the swing arm 23 and the main frame 13. The headlight 25 is disposed forwardly of an upper portion of the front fork 21. The fuel tank 26 is disposed upwardly of the main frames 13. The rider seat 27 and the pillion seat 28 are disposed rearwardly of the fuel tank 26 and upwardly of the rear frames 16, respectively. In FIG. 1, a rear flasher 31 is provided together with a taillight 32.

Figure 2:
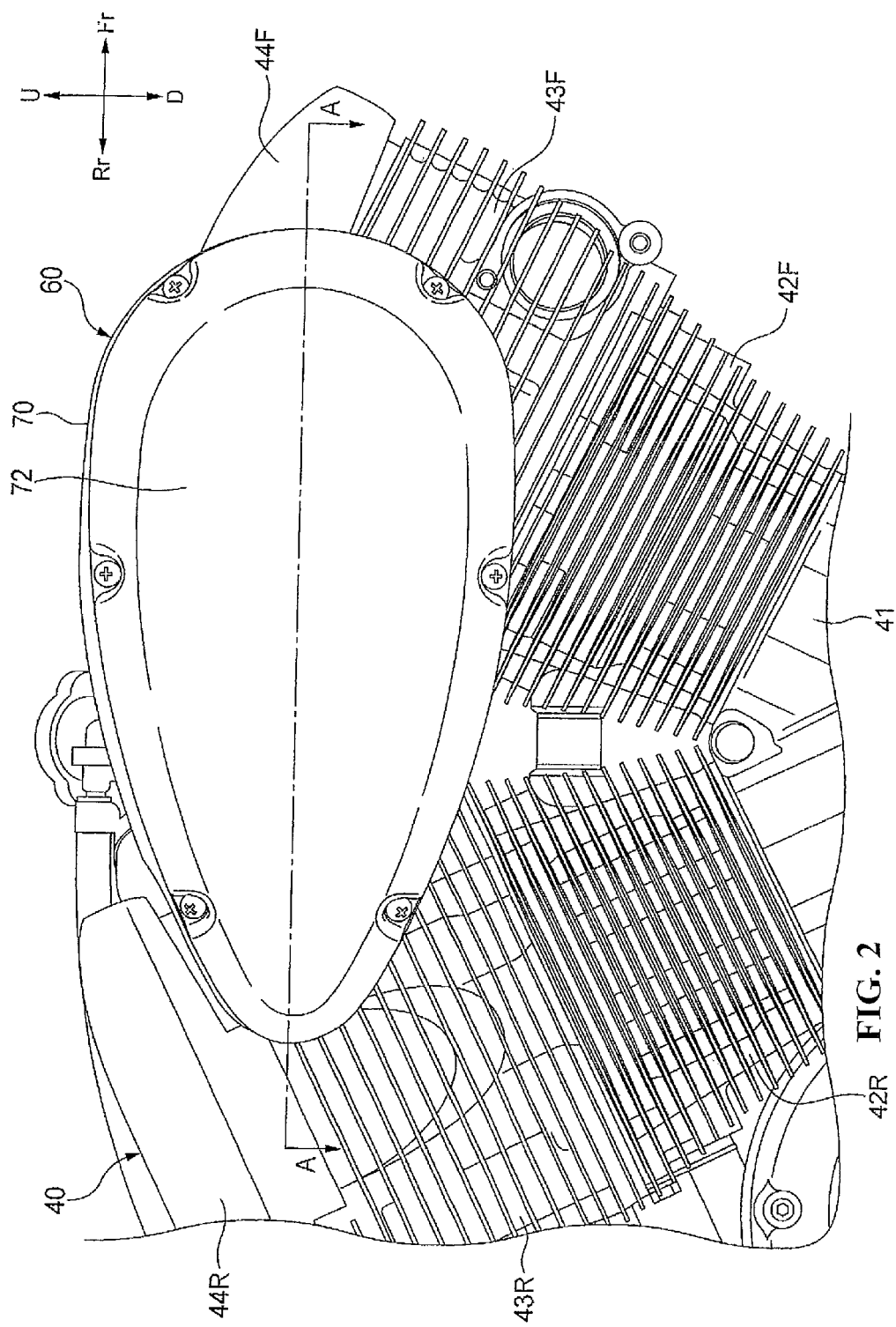
FIG. 2 is an enlarged right side elevational view showing parts around an air cleaner shown in FIG. 1.

The engine 40 is a water-cooled V-type two-cylinder engine. Referring to FIGS. 1 and 2, the engine 40 includes a crankcase 41, a front side cylinder block 42F, a rear side cylinder block 42R, a front side cylinder head 43F, a rear side cylinder head 43R, a front side cylinder head cover 44F, and a rear side cylinder head cover 44R. More specifically, the front side cylinder block 42F is disposed in a forwardly inclined position at a forward upper end portion of the crankcase 41. The rear side cylinder block 42R is disposed in a rearwardly inclined position at the forward upper end portion of the crankcase 41. The front and rear side cylinder heads 43F, 43R are disposed at upper end portions of the front and rear side cylinder blocks 42F, 42R, respectively. The front and rear side cylinder head covers 44F, 44R cover upper portion openings in the front and rear side cylinder heads 43F, 43R, respectively. The front side cylinder block 42F, the front side cylinder head 43F, and the front side cylinder head cover 44F form a front bank. The rear side cylinder block 42R, the rear side cylinder head 43R, and the rear side cylinder head cover 44R form a rear bank.

Figure 3:
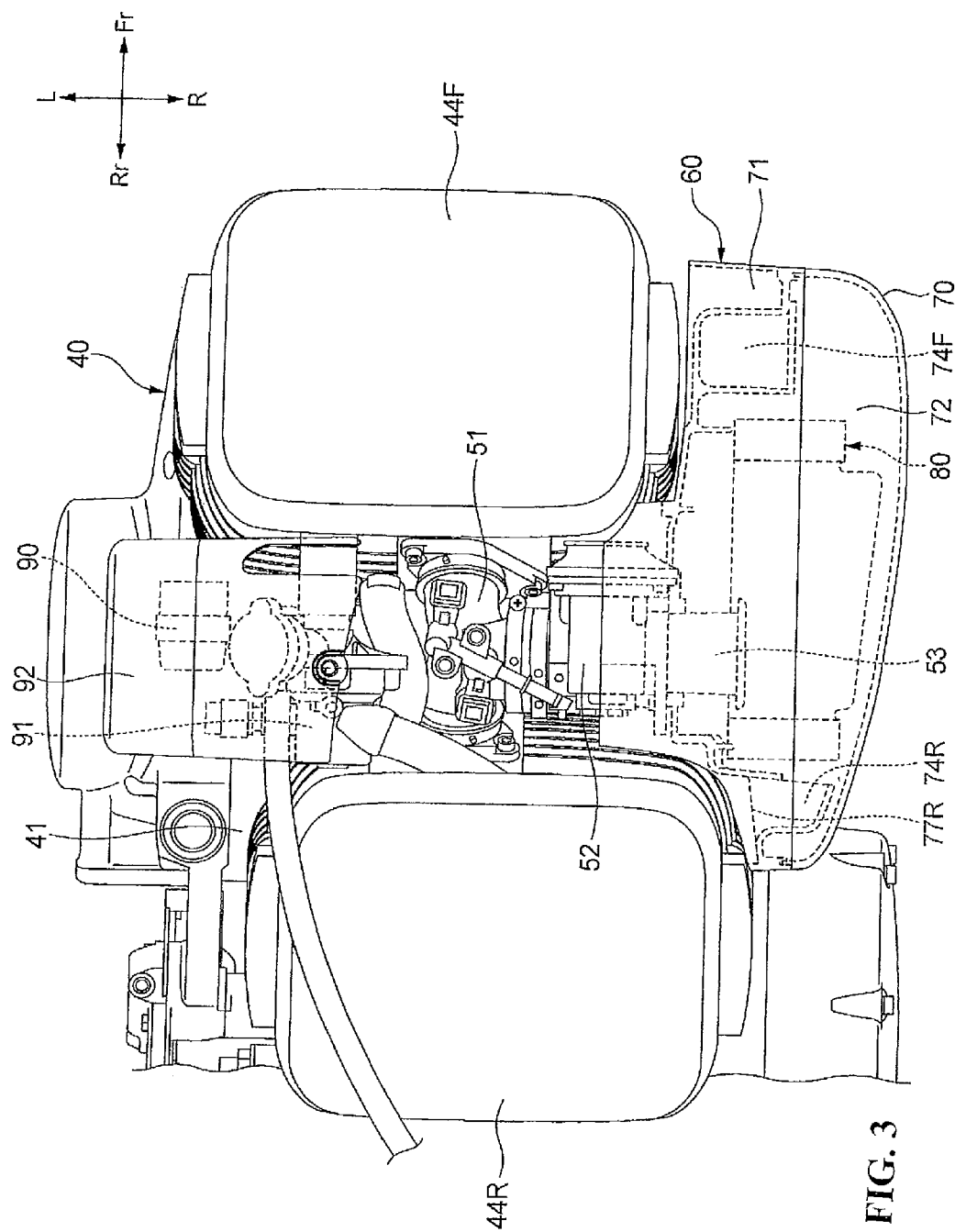
FIG. 3 is an enlarged plan view showing parts around the air cleaner shown in FIG. 1.

Referring to FIG. 3, a throttle body 52 is connected via an air intake pipe 51 to an air intake port not shown formed at a rear portion of the front side cylinder head 43F and a front portion of the rear side cylinder head 43R. An air intake funnel 53 of a bell mouth shape and an air cleaner 60 are connected to an outer end portion in a vehicle width direction (a right end portion according to the embodiment of the present invention) of the throttle body 52. In addition, according to the embodiment of the present invention, the air intake pipe 51 and the throttle body 52 form an air intake path. The air intake path is disposed between the front side cylinder head 43F as the front bank and the rear side cylinder head 43R as the rear bank.

Referring to FIGS. 2 through 6, the air cleaner 60 includes an air cleaner case 70 and an air cleaner element 80. More specifically, the air cleaner case 70 is connected to a right end portion of the throttle body 52. The air cleaner element 80 is housed in the air cleaner case 70.

Figure 4:
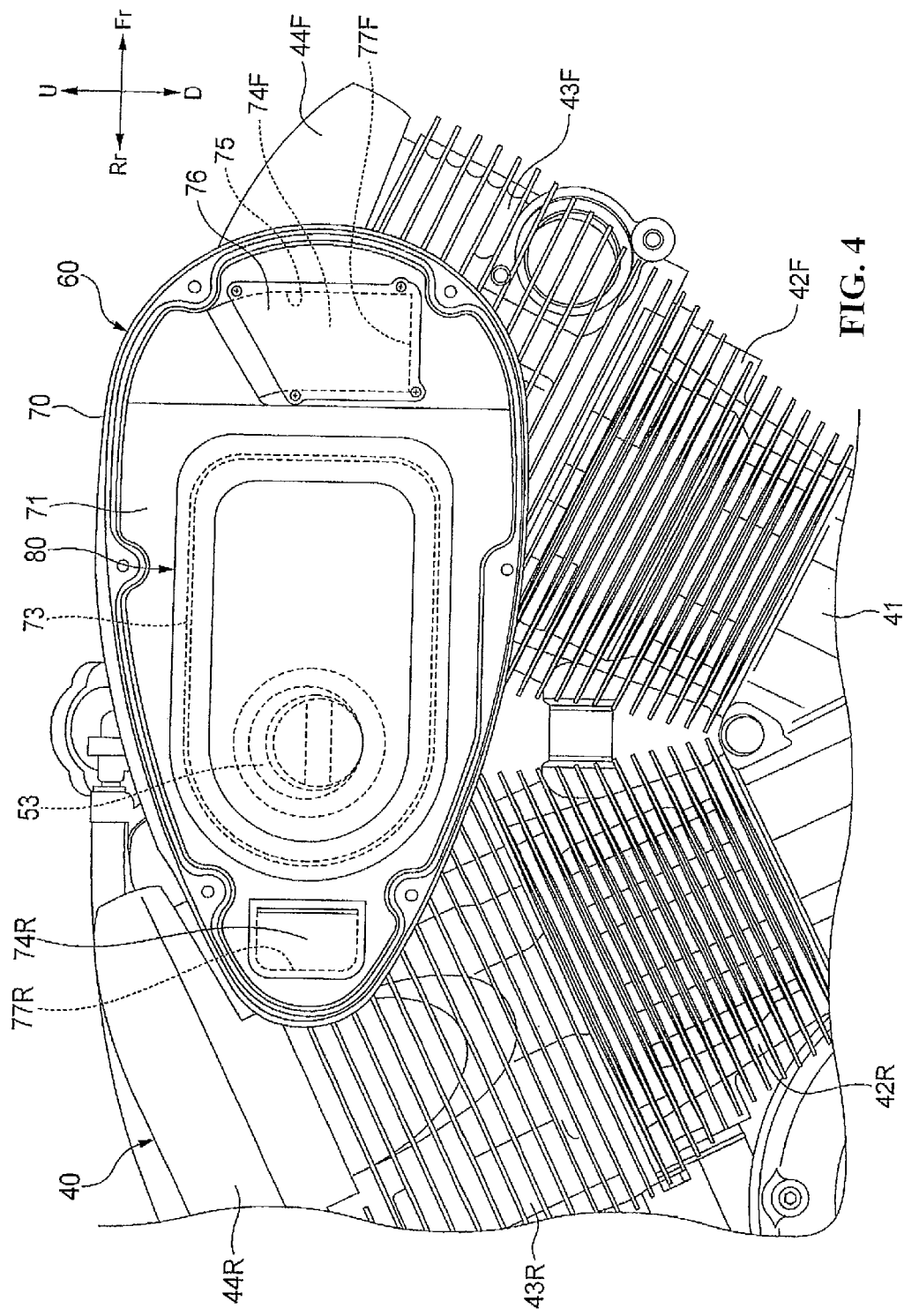
FIG. 4 is an enlarged right side elevational view showing the parts around the air cleaner shown in FIG. 2 from which a lid member is removed.

Referring to FIGS. 2 through 4, the air cleaner case 70 includes a case main body 71 and a lid member 72 that closes an opening in the case main body 71. The air cleaner case 70 is formed into a substantially streamlined shape (what is called, a teardrop shape) in a vehicle side view, having a larger arc on the vehicle forward side and a smaller arc on the vehicle rearward side.

Figure 5:
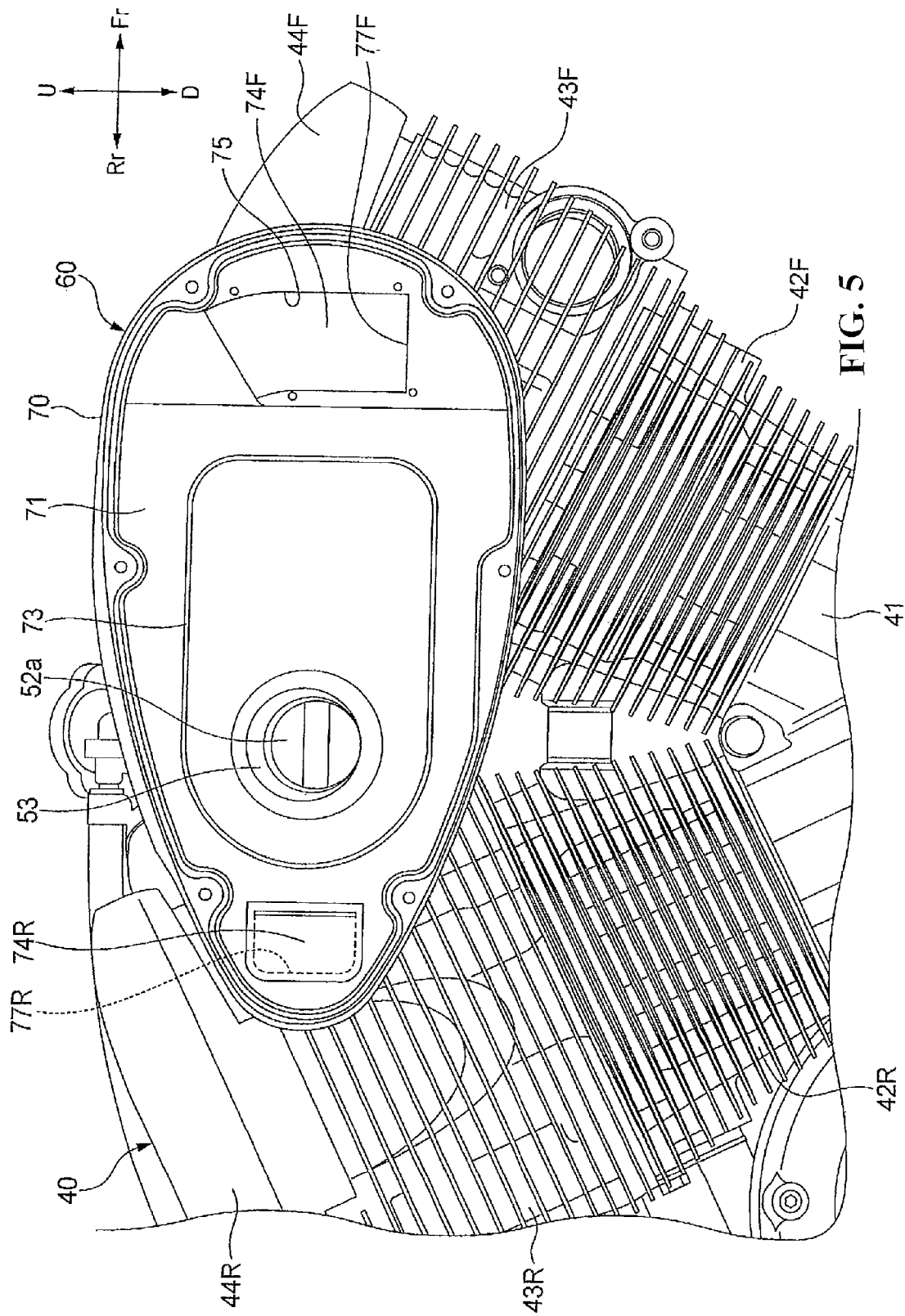
FIG. 5 is an enlarged right side elevational view showing the parts around the air cleaner shown in FIG. 4 from which an air cleaner element and a duct formation lid portion are removed.

Referring to FIGS. 4 and 5, the air cleaner element 80 has an asymmetric shape in a vehicle longitudinal direction in the vehicle side view. More specifically, the air cleaner element 80 is formed substantially into a reverse D-shape in the side view, having a substantially rectangular shape on the vehicle forward side and a circular shape on the vehicle rearward side. The air cleaner element 80 is then fitted to, and supported by, an element support frame portion 73 having the similar reverse D-shape in the side view formed substantially at a center of the case main body 71.

Figure 6:
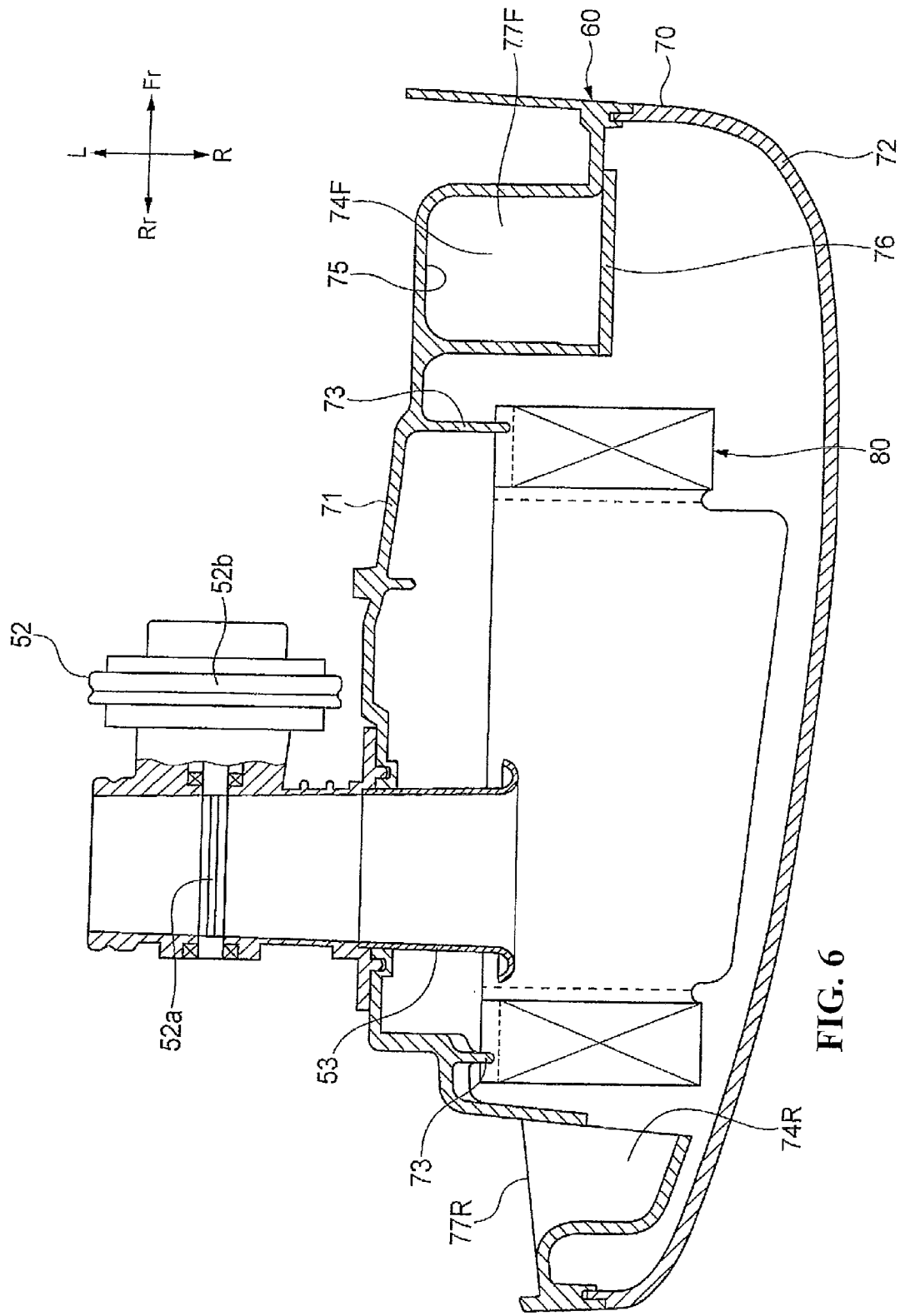
FIG. 6 is a cross-sectional view on arrow A-A of the air cleaner shown in FIG. 2.

Referring to FIGS. 4 through 6, the case main body 71 includes a front side air intake duct 74F and a rear side air intake duct 74R disposed on either side in the vehicle longitudinal direction across the air cleaner element 80. The front side air intake duct 74F and the rear side air intake duct 74R introduce outside air into the air cleaner element 80.

Referring to FIGS. 4 and 5, in the embodiment of the present invention, the front side air intake duct 74F and the rear side air intake duct 74R are disposed outwardly in the vehicle width direction of the front side cylinder head 43F as the front bank and the rear side cylinder head 43R as the rear bank in the vehicle side view.

Referring to FIGS. 4 through 6, the front side air intake duct 74F includes a duct formation recessed portion 75 and a duct formation lid portion 76. More specifically, the duct formation recessed portion 75 is formed at a front end portion of the case main body 71. The duct formation lid portion 76 covers an outside of the duct formation recessed portion 75. Further, the duct formation recessed portion 75 includes a front side air intake port 77F. The front side air intake port 77F is disposed at a lower end portion of the duct formation recessed portion 75 and opens downwardly. Accordingly, the front side air intake duct 74F extends in a vehicle vertical direction, so that air can be drawn in from a lower side of the air cleaner case 70 via the front side air intake port 77F. This allows an air flow to be drawn in despite the location of the air cleaner 60 near the engine 40.

Referring to FIGS. 4 through 6, the rear side air intake duct 74R includes a dome-like protruding portion having a substantially semi-circular shape. The protruding portion is formed at a rear end portion of the case main body 71. In addition, a rear side air intake port 77R that opens inwardly in the vehicle width direction is formed at an inner end portion in the vehicle width direction of the rear side air intake duct 74R. As a result, the rear side air intake duct 74R extends in the vehicle width direction, so that air can be drawn in from the inside in the vehicle width direction of the air cleaner case 70 via the rear side air intake port 77R. In addition, in the embodiment of the present invention, the front side air intake port 77F of the front side air intake duct 74F is larger than the rear side air intake port 77R of the rear side air intake duct 74R.

In addition, in the embodiment of the present invention, referring to FIGS. 3 and 6, an accelerator position sensor (APS) 90 is disposed on a side of the engine 40 opposite to the air cleaner 60 in the vehicle width direction across the engine 40, more specifically, on the left side of the engine 40. The accelerator position sensor 90 detects an operational amount of a throttle grip and transmits a corresponding detection signal to a control motor 52b that drives a throttle valve 52a of the throttle body 52, so that the throttle valve 52a is driven according to the operation amount. In addition, the accelerator position sensor 90 is fixed to a stay not shown extending from the air intake pipe 51 between the V banks of the front side cylinder head 43F and the rear side cylinder head 43R of the V-type two-cylinder engine 40 and housed in an auxiliaries cover 92 together with a thermostat 91.

As described heretofore, the saddle-riding type vehicle 10 according to the embodiment of the present invention includes the throttle body 52 disposed between the front side cylinder head 43F and the rear side cylinder head 43R and the air cleaner 60 connected to the outer side of the throttle body 52 in the vehicle width direction. The air cleaner 60 includes the air cleaner case 70 and the air cleaner element 80 housed in the air cleaner case 70. Further, the case main body 71 of the air cleaner case 70 includes the front side air intake duct 74F and the rear side air intake duct 74R disposed on either side of the air cleaner element 80 in the vehicle longitudinal direction across the air cleaner element 80. The structure of the air cleaner 60 can therefore be simplified, so that manufacturing cost can be reduced. The front side air intake duct 74F and the rear side air intake duct 74R are disposed on either side of the air cleaner element 80 in the vehicle longitudinal direction across the air cleaner element 80. The entire air cleaner element 80 can therefore be effectively used.

In the saddle-riding type vehicle 10 according to the embodiment of the present invention, the air cleaner case 70 is formed into a substantially streamlined shape (what is called, the teardrop shape) in the vehicle side view, having a larger arc on the vehicle forward side and a smaller arc on the vehicle rearward side. Because the rear side air intake duct 74R is disposed at a rear end portion of the air cleaner case 70, a dead space of the rear end portion of the air cleaner case 70 having the substantially streamlined shape (the so-called teardrop shape) can be effectively used.

In the saddle-riding type vehicle 10 according to the embodiment of the present invention, the front side air intake duct 74F and the rear side air intake duct 74R are disposed outwardly in the vehicle width direction of the front side cylinder head 43F and the rear side cylinder head 43R in the vehicle side view. The front side air intake port 77F of the front side air intake duct 74F and the rear side air intake port 77R of the rear side air intake duct 74R are not therefore exposed on the outside, which improves appearance of the saddle-riding type vehicle 10 and prevents entry of dust, water, or other foreign matter in the air cleaner case 70.

In the saddle-riding type vehicle 10 according to the embodiment of the present invention, the front side air intake duct 74F extends in the vehicle vertical direction, while the rear side air intake duct 74R extends in the vehicle width direction. Entry of dust, water, or other foreign matter in the air cleaner case 70 can be further prevented.

In the saddle-riding type vehicle 10 according to the embodiment of the present invention, the front side air intake duct 74F draws air in from the lower side of the air cleaner case 70, while the rear side air intake duct 74R draws air in from the inner side in the vehicle width direction of the air cleaner case 70. Entry of dust, water, or other foreign matter in the air cleaner case 70 can be even further prevented.

In addition, in the saddle-riding type vehicle 10 according to the embodiment of the present invention, the air cleaner element 80 has an asymmetric shape in the vehicle longitudinal direction in the vehicle side view. More specifically, the air cleaner element 80 is formed substantially into a reverse D-shape in the side view, having a substantially rectangular shape on the vehicle forward side and a circular shape on the vehicle rearward side. The air cleaner element 80 can therefore be made large to fit the shape of the air cleaner case 70, so that the air cleaner element 80 can have a larger filtration area.

While the present invention has been particularly shown and described with reference to a preferred embodiment, it will be understood by those skilled in the art that various changes in form and detail may be made therein without departing from the spirit and scope of the invention.

For example, in the above-described embodiment of the present invention, the air cleaner is disposed on the right-hand side of the vehicle and the accelerator position sensor is disposed on the left-hand side of the vehicle. The arrangement is not limited to the foregoing and the air cleaner may be disposed on the left-hand side of the vehicle and the accelerator position sensor may be disposed on the right-hand side of the vehicle.

In addition, in the above-described embodiment of the present invention, the air cleaner case is of the substantially streamlined shape (the so-called teardrop shape). The streamlined shape is not the only possible shape, but the air cleaner case may be elliptic or oblong.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle-riding vehicle having a V engine disposed between a front wheel and a rear wheel, the V engine including a front bank that extends upwardly from a crankcase at a front portion thereof and a rear bank that extends upwardly from the crankcase at a rear portion thereof, the saddle-riding type vehicle comprising:
    an air intake path disposed between the front bank and the rear bank; and
    an air cleaner connected to an outer side of the air intake path in a vehicle width direction, wherein:
    the air cleaner includes an air cleaner element housed in an air cleaner case; and
    the air cleaner case includes air intake ducts disposed on opposite sides of the air cleaner element, in a vehicle longitudinal direction across the air cleaner element, wherein a front side air intake duct of the air intake ducts extends in a vehicle vertical direction, whereas the rear side air intake duct extends in the vehicle width direction.

2. The saddle-riding vehicle according to claim 1, wherein:
    the air cleaner case is formed into a substantially streamlined shape in a vehicle side view, having a larger arc on a vehicle forward side and a smaller arc on a vehicle rearward side; and
    a rear side air intake duct of the air intake ducts is disposed at a rear end portion of the air cleaner case.

3. The saddle-riding vehicle according to claim 2, wherein the front side air intake duct draws air in from a lower side of the air cleaner case, while the rear side air intake duct draws air in from an inner side in the vehicle width direction of the air cleaner case.

4. The saddle-riding vehicle according to claim 3, wherein the air cleaner element is formed into an asymmetric shape in the vehicle longitudinal direction in a vehicle side view.

5. The saddle-riding vehicle according to claim 2, wherein the air cleaner element is formed into an asymmetric shape in the vehicle longitudinal direction in a vehicle side view.

6. The saddle-riding vehicle according to claim 1, wherein the air cleaner element is formed into an asymmetric shape in the vehicle longitudinal direction in a vehicle side view.

7. The saddle-riding vehicle according to claim 1, wherein the air intake ducts are disposed outwardly in the vehicle width direction of the front bank and the rear bank in a vehicle side view.

8. The saddle-riding vehicle according to claim 7, wherein the front side air intake duct draws air in from a lower side of the air cleaner case, while the rear side air intake duct draws air in from an inner side in the vehicle width direction of the air cleaner case.

9. The saddle-riding vehicle according to claim 7, wherein the air cleaner element is formed into an asymmetric shape in the vehicle longitudinal direction in a vehicle side view.

10. An air filter for use with a vehicle having a V engine disposed between a front wheel and a rear wheel, the V engine including a front bank that extends upwardly from a crankcase at a front portion thereof and a rear bank that extends upwardly from the crankcase at a rear portion comprising:
    an air intake path disposed between the front bank and the rear bank; and
    an air cleaner connected to an outer side of the air intake path in a vehicle width direction, said air cleaner including an air cleaner element disposed in an air cleaner case; and
    air intake ducts disposed on opposite sides of the air cleaner element, in a vehicle longitudinal direction across the air cleaner element, wherein a front side air intake duct of the air intake ducts extends in a vehicle vertical direction, whereas the rear side air intake duct extends in the vehicle width direction.

11. The air filter according to claim 10, wherein:
    the air cleaner case is formed into a substantially streamlined shape in a vehicle side view, having a larger arc on a vehicle forward side and a smaller arc on a vehicle rearward side; and
    a rear side air intake duct of the air intake ducts is disposed at a rear end portion of the air cleaner case.

12. The air filter according to claim 11, wherein the front side air intake duct draws air in from a lower side of the air cleaner case, while the rear side air intake duct draws air in from an inner side in the vehicle width direction of the air cleaner case.

13. The air filter according to claim 12, wherein the air cleaner element is formed into an asymmetric shape in the vehicle longitudinal direction in a vehicle side view.

14. The air filter according to claim 11, wherein the air cleaner element is formed into an asymmetric shape in the vehicle longitudinal direction in a vehicle side view.

15. The air filter according to claim 10, wherein the air intake ducts are disposed outwardly in the vehicle width direction of the front bank and the rear bank in a vehicle side view.

16. The air filter according to claim 15, wherein the front side air intake duct draws air in from a lower side of the air cleaner case, while the rear side air intake duct draws air in from an inner side in the vehicle width direction of the air cleaner case.

17. The air filter according to claim 15, wherein the air cleaner element is formed into an asymmetric shape in the vehicle longitudinal direction in a vehicle side view.

18. The air filter according to claim 10, wherein the air cleaner element is formed into an asymmetric shape in the vehicle longitudinal direction in a vehicle side view.

* * * * *